(12) United States Patent
Baus et al.

(10) Patent No.: US 9,586,451 B2
(45) Date of Patent: Mar. 7, 2017

(54) AMPHIBIOUS VEHICLE AND METHOD FOR OPERATING AN AMPHIBIOUS VEHICLE

(71) Applicant: Krauss-Maffei Wegmann GmbH & Co. KG, Munich (DE)

(72) Inventors: Rudiger Baus, Munich (DE); Harald Bachmann, Munich (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 36 days.

(21) Appl. No.: 14/355,543

(22) PCT Filed: Oct. 19, 2012

(86) PCT No.: PCT/DE2012/100326
§ 371 (c)(1),
(2) Date: Nov. 5, 2014

(87) PCT Pub. No.: WO2013/064142
PCT Pub. Date: May 10, 2013

(65) Prior Publication Data
US 2015/0126083 A1 May 7, 2015

(30) Foreign Application Priority Data
Oct. 31, 2011 (DE) .................. 10 2011 054 949

(51) Int. Cl.
*F41H 7/02* (2006.01)
*B60F 3/00* (2006.01)
(Continued)

(52) U.S. Cl.
CPC ............ *B60F 3/003* (2013.01); *B60F 3/0061* (2013.01); *F16M 11/32* (2013.01); *F41H 7/02* (2013.01);
(Continued)

(58) Field of Classification Search
CPC ......... B60F 3/0007; B60F 3/00; B60F 3/0046
See application file for complete search history.

(56) References Cited

U.S. PATENT DOCUMENTS 2,397,791 A * 4/1946 Kramer ................ B60F 3/0007
180/312
3,785,325 A 1/1974 Mycroft
(Continued)

FOREIGN PATENT DOCUMENTS

DE 1819713 3/1959
DE 1124383 B 2/1962
(Continued)

OTHER PUBLICATIONS

International Search Report—Feb. 4, 2014.

*Primary Examiner* — Edwin Swinehart
(74) *Attorney, Agent, or Firm* — Thompson Hine LLP (57) ABSTRACT

An amphibious vehicle, in particular military, amphibious vehicle, includes a first end region (2) and a second end region (3) opposite the latter in the longitudinal direction of the vehicle. The first end region (2) is designed as a land driving front and the second end region (3) is designed as a ship's bow for water travel. In a method for operating an amphibious vehicle (1), the main travel direction of the amphibious vehicle (1) is reversed upon transfer between land travel and water travel.

18 Claims, 5 Drawing Sheets

(51) Int. Cl.
*F41H 7/04* (2006.01)
*F16M 11/32* (2006.01)

(52) U.S. Cl.
CPC ............ *F41H 7/044* (2013.01); *F41H 7/048* (2013.01); *F16M 2200/025* (2013.01)

(56) References Cited

U.S. PATENT DOCUMENTS

| | | |
|---|---|---|
| 6,957,991 B2 | 10/2005 | Gibbs |
| 2005/0145157 A1 | 7/2005 | Choi |

FOREIGN PATENT DOCUMENTS

| | | |
|---|---|---|
| DE | 3740073 A1 | 8/1989 |
| GB | 1345829 | 2/1974 |
| WO | 0212005 A1 | 2/2002 |

\* cited by examiner

AMPHIBIOUS VEHICLE AND METHOD FOR OPERATING AN AMPHIBIOUS VEHICLE

The instant application should be granted the priority dates of Oct. 31, 2011, the filing date of the corresponding German patent application DE 10 2011 054 949.8, as well as Oct. 19, 2012, the filing date of the International patent application PCT/DE2012/100326.

BACKGROUND OF THE INVENTION

The invention relates to an amphibious vehicle, in particular a military amphibious vehicle, with a first end region and a second end region disposed opposite thereto in the longitudinal direction of the vehicle. The invention further relates to a method for operating an amphibious vehicle.

With amphibious vehicles, which can travel on land as well as water, the required floating capability of the amphibious vehicle requires particular specifications. In particular, in the field of military amphibious vehicles, which have a much heavier weight because of their armored design provided to protect against ballistic threats, for example, the problem exists that these vehicles will be immersed relatively deeply during water travel.

The end region of the amphibious vehicle facing in the main travel direction during water travel, therefore, is typically embodied to be relatively high so that it will project upward out of the water over the water line. Thus, a comparably high silhouette of the vehicle is provided in its front region. For land travel, this type of vehicle silhouette, however, is rather unfavorable, since this feature, in particular in the field of armored military vehicles, often involves an impaired ground view.

SUMMARY OF THE INVENTION

The object of the invention is to provide an amphibious vehicle as well as a method for operating an amphibious vehicle, which is suitable for land travel operation with good visibility conditions as well as water travel.

With an amphibious vehicle of the above-noted type, the solution to this object is proposed, such that the first end region is formed as a land driving front and the second end region is formed as a ship's bow for water travel.

In this manner, the different specifications for water operation, on the one hand, and land operation, on the other hand, can be taken into consideration in a simple manner. The first end region of the amphibious vehicle formed as a land driving front is directed in the main travel direction during land travel and can be embodied with a relatively low silhouette, so that no impairment of ground visibility occurs. The other end region, embodied as a ship's bow, is directed to the front or forward during water travel in the direction of the main water travel direction of the amphibious vehicle and can be formed to be relatively high, whereby a good floating capability is provided. Upon transition between land and water travel, the vehicle is rotated, so that then the end region of the amphibious vehicle that is optimized for the respective manner of travel is oriented in the direction of travel, whereby favorable travel or travel properties on land as well as water can be achieved.

One embodiment of the invention contemplates that the vehicle height in the region of the ship's bow is greater than the vehicle height in the region of the land driving front, so that the ship's bow always projects over the water line, even when the other end region is already submerged.

One embodiment that is advantageous, for example, in the event of larger than expected swell or in the event of increased vehicle weight caused by load contemplates that the vehicle height in the area of the ship's bow is increased via at least one swell element. By arrangement of such swell elements in the region of the ship's bow, the vehicle height may be increased temporarily.

In this connection, it is further proposed that the swell element is arranged in the area of the roof of a vehicle inner chamber. The swell element can be releasably connected to the roof of the vehicle's inner chamber, for example, with screws, or non-releasably connected for example, via welding. It also is contemplated that the swell element is included permanently in the region of the roof and is pivoted when necessary into a position that increases the height of the vehicle.

A constructively advantageous embodiment contemplates that the swell element is formed as a baffle plate or wash plate. The baffle plate or wash plate can elongate the contour of the ship's bow upward by following the contour of the ship's bow, whereby an overall higher ship's bow is achieved.

A further embodiment that is advantageous for land travel contemplates that the land driving front has a surface that is inclined in the direction of the path of travel for improving the ground visibility. Along this surface that is inclined downwardly, an outwardly directed visual path can be provided from the vehicle interior over an optical square, whereby in the region of the land driving front, favorable ground visibility properties are provided.

Furthermore, it is proposed that a land drive and a water drive operating in the opposite direction are provided. By means of the drives acting in opposite directions, the amphibious vehicle can be driven according to the respective main travel direction during land or water travel. Upon transition between land and water travel, the two drives can be switched, whereby it is also contemplated to operate temporarily both drives simultaneously.

Advantageously, the land drive is arranged in the area of the ship's bow and/or the water drive in the region of the land driving front, whereby during land as well as water travel, a respective rear-wheel drive concept is provided.

One advantageous structural embodiment contemplates that the land drive and the water drive are driven via the same engine, which is embodied, in particular, as a mid-engine. The land drive can be flange-connected via a manual or steering gear or transfer gearbox to the engine. The water drive likewise can be flange-connected via a manual gear to the motor. The embodiment of the engine as a mid-engine with simultaneous rear-wheel drive of the amphibious vehicle via land drive permits a vehicle construction in which in the area of the ship's bow, an access opening for the vehicle occupants is provided.

Furthermore, an advantageous structural embodiment of the invention provides that the land drive and the water drive are disposed on opposite sides of the engine and are connected or attached to the engine.

In a further embodiment of the invention, it is proposed that the land drive and/or the water drive are connected via a gear unit to the engine.

Furthermore, for the solution of the above-stated object a method of the above-noted type is proposed, in which the main travel direction of the amphibious vehicle is reversed during transition between land and water travel.

In this manner, the different specifications for the water drive, on the one hand, and the land drive, on the other hand, can be calculated in a simple manner. The first end region of the amphibious vehicle formed as a land driving front is oriented forward, or to the front, during land travel in the main travel direction and can be embodiment with a relatively low silhouette, so that the ground visibility is not impaired. The other end region embodied as a ship's bow, lies forward, or in the front, during water travel in the direction of the main water travel direction of the amphibious vehicle and can be embodied to be relatively high, whereby a favorable floating capability is provided. Upon transition between land and water travel, the vehicle is rotated, so that then the end region of the amphibious vehicle is directed in the travel direction for the respective manner of operation, whereby favorable driving properties can be achieved on land as well as water.

In a further embodiment of the method, it is proposed that the amphibious vehicle is formed in the previously described manner.

In addition, it is proposed that the amphibious vehicle rotates during the transition between land and water travel, such that during land travel, the land driving front and during water travel, the ship's bow, is oriented in the main direction of travel.

Furthermore, it is proposed that upon transition between land and water travel, it can be switched between the land drive and the water drive. It also can be advantageous if during the transition between land and water travel, both drives are operated temporarily in parallel.

Finally, one embodiment that is advantageous with regard to a high traveling speed during water travel contemplates that the amphibious vehicle is coupled together with at least one further amphibious vehicle to form a floating assemblage.

BRIEF DESCRIPTION OF THE DRAWINGS

Further advantages and details of the amphibious vehicle according to the present invention as well as the method for operating an amphibious vehicle according to the present invention will be explained next with reference to the accompanying drawings. In the drawings.

DETAILED DESCRIPTION OF SPECIFIC EMBODIMENTS

Figure 1:
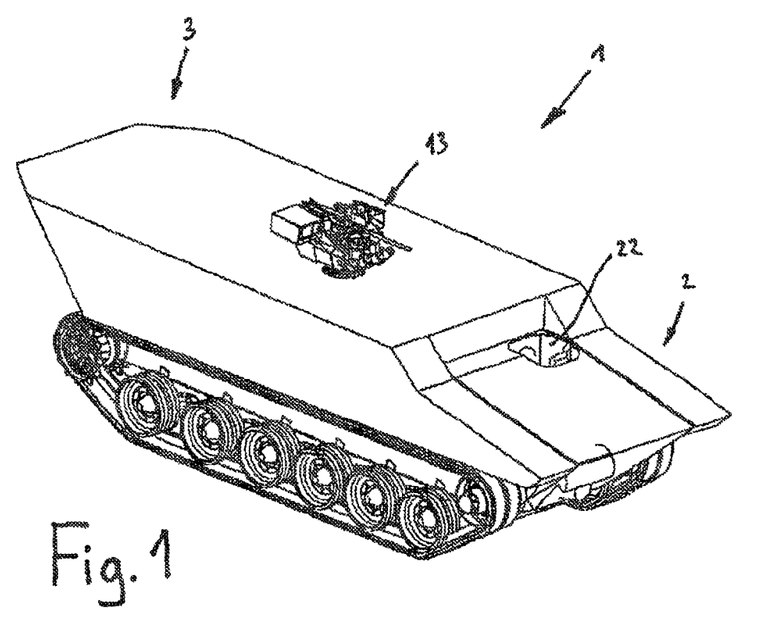
FIG. 1: shows an amphibious vehicle in perspective view.
Figure 2:
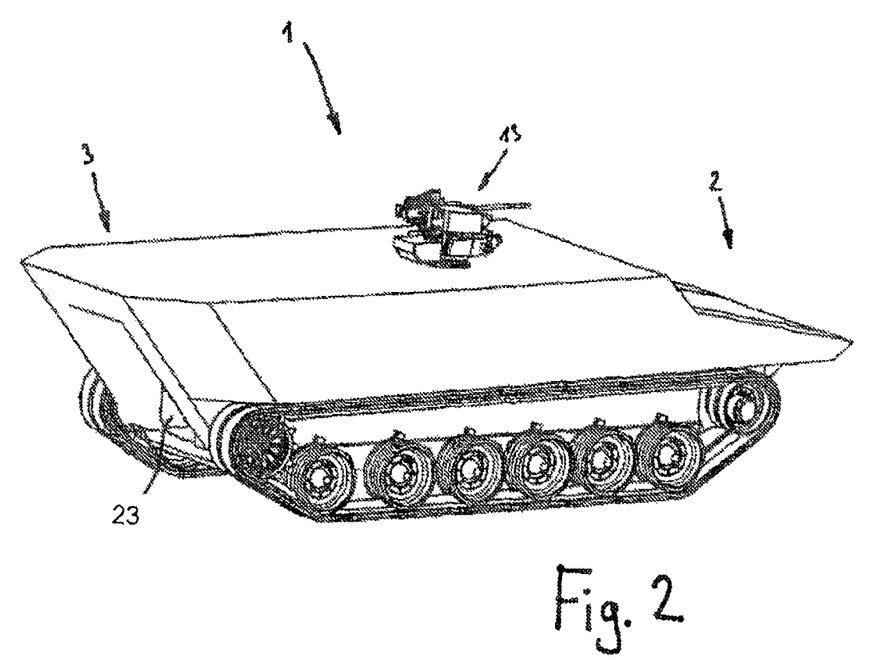
FIG. 2: shows a further perspective view of the amphibious vehicle of FIG. 1.

In FIGS. 1 and 2, an amphibious vehicle is shown in different perspective views. The amphibious vehicle is a chain-driven military vehicle, which is armor-clad to protect against military threats and in this respect, has a substantial total weight.

The amphibious vehicle 1, as viewed in the longitudinal direction of the vehicle, has two oppositely disposed end regions 2, 3. One of the end regions 2 is formed as a land driving front 2. In the case of land travel, the land driving front 2 is directed in the main travel direction of the amphibious vehicle 1, that is, any direction which corresponds to the forward travel in land travel operation. The other end region 3 is formed as a ship's bow and is oriented, in the case of water travel, in the main travel direction, that is, the forward travel in water operation. The silhouette of the amphibious vehicle 1 is such that a higher ship's bow 3 and a lower land travel front 2 are provided.

Figure 3:
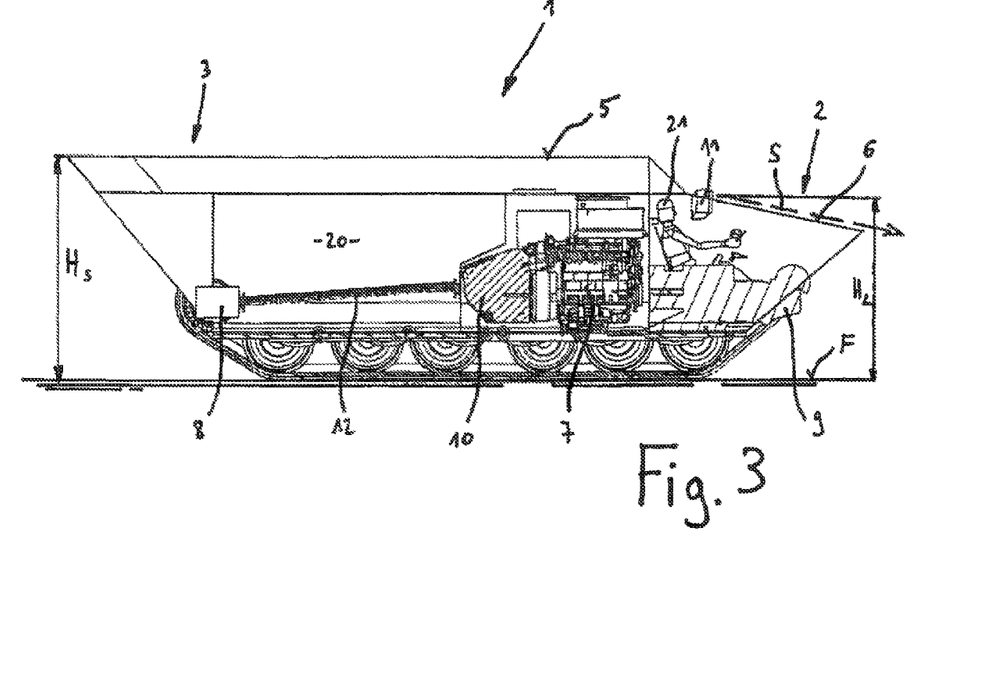
FIG. 3: shows a vertical section through the amphibious vehicle according to the illustration of FIG. 1, FIG. 4: shows a horizontal section through an amphibious vehicle according to the illustration in FIG. 1, FIG. 5: shows two amphibious vehicles during water travel in a plan view.

As can be seen in FIG. 3, the ship's bow 3 has a height $H_S$ that is greater than the vehicle height $H_L$ of the land travel front 2. Since the ship's bow 3, which is tapered toward the vehicle longitudinal center plane, has a greater height $H_S$, this projects always over the water line, even when the lower end region 2 is already submerged beneath the water line.

Based on the lower height $H_L$ of the land driving front 2, in land travel operation, an improved ground visibility for the driver 21 of the amphibious vehicle 1 is provided, who observes the environment surrounding the vehicle from the protected vehicle interior over an optical square 11. A sight path S of the driver 21 is guided over the optical square 11 along a surface 6 that is inclined relative to the land driving front 2, whereby a good ground visibility is provided for the driver 21. It is also possible that the driver 21 raises his seating position, so that his head projects through a hatch 22 provided on the land driving front 2 toward the exterior of the vehicle, whereby particularly good visibility conditions are provided for the driver 21 (compare also FIG. 1). This operation, also known as "look-out travel", is suitable, for example, for cruising speeds in secured territories, since the head of the driver projects out of the protected vehicle interior.

In the event of water travel, the main travel direction of the amphibious vehicle 1 changes; that is, the ship's bow 3 lies in the front during water travel in the main travel direction, whereby the amphibious vehicle 1 is turned during transition between land and water travel.

During water travel, the driver 21 can rotate his seat and with this, if necessary, any control elements, so that he looks in the direction of the ship's bow 3. The driver 21 can have at his disposal a path of vision facing in the direction of the corresponding main travel direction, which can be achieved via visual equipment electronically or in a ray optical manner. In this connection, for example, visual equipment of a weapon station 13 formed as a type of remote-controlled gun carriage and provided in the roof 5 of the interior chamber 20 of the amphibious vehicle 1 can be used. The weapon station 13 or the visual equipment arranged on it are disposed at a distance relative to the roof 5 of the amphibious vehicle 1 and in this respect, form a type of elevated view. During water travel, the weapon station 13 can be oriented in an azimuth direction corresponding to the water travel direction of the amphibious vehicle 3 in the direction of the ship's bow 3 and its visual equipment for water travel can be used.

Alternatively, it is also contemplated that the driver 21, in the case of water travel, assumes a position within the amphibious vehicle 1 that deviates from the seating place shown in FIG. 3 and looks through a hatch provided in the roof area of the amphibious vehicle 1 in the direction of the ship's bow 3. In this manner, particularly good visibility conditions for the driver 21 during water travel are provided.

Figure 4:
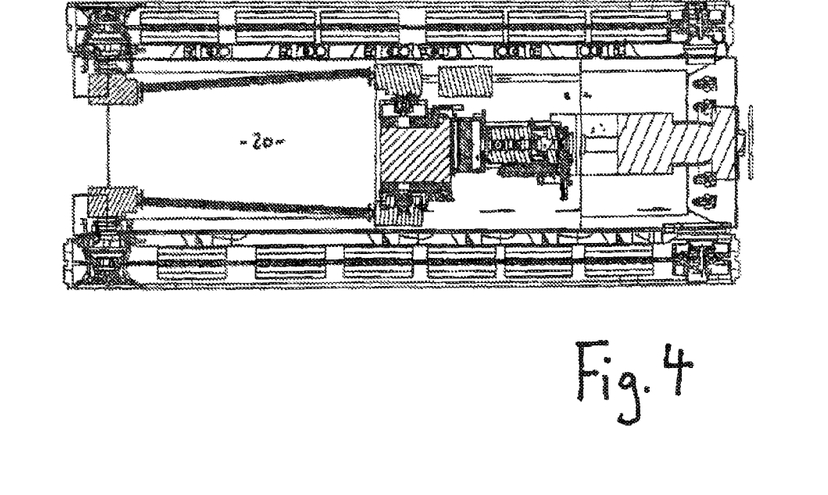

For water as well as land travel, a specialized land drive 8 or water drive 9 is provided. The land drive 8 is located in the area of the ship's bow 3 and is formed by a drive element engaging a chain of the amphibious vehicle 1. Via a connection shaft 12 and a gear unit 10, the land drive 8 is connected to an internal combustion engine 7 formed as a mid-engine. The water drive 9 is disposed on the opposite side of the engine 7 in the area of the driver 21. The water drive 9 can be formed from one or more ship's propellers or partially also as a water jet drive designated as a jet drive. The water drive 9 likewise is flanged via a gear unit to the engine 7. The arrangement of the engine 7 as well as the gear unit 10 in the center of the amphibious vehicle 1 is selected, so that a position of center of gravity of the entire amphibious vehicle 1 that is favorable for water travel is provided.

Because the engine 7 is embodied as a mid-engine, it is possible that the vehicle interior 20 that serves to receive pieces of equipment or a crew, for example, is made accessible via a hatch 23 arranged on the rear side during land travel. The hatch 23 is provided in the area of the ship's bow 3 and is formed as a pivotable entry or escape hatch.

Upon transition between land and water travel, the main travel direction of the amphibious vehicle 1 is reversed, and it is switched between the land drive 8 and the water drive 9. While during land travel, the land driving front 2 forms the front and the ship's bow 3 the rear of the amphibious vehicle 1, during water travel, the ship's bow 3 forms the vehicle front and the land driving front 2 forms the vehicle rear. In addition, it is possible that during transition between land and water travel, the land drive 8 as well as the water drive 9 are operated in parallel temporarily.

The amphibious vehicle 1 can, during transition between land and water travel, be driven forwards as viewed in the land travel direction as well as in reverse in the water. Also, landing of the amphibious vehicle 1 during transition between water and land travel can take place in both directions.

Figure 5:
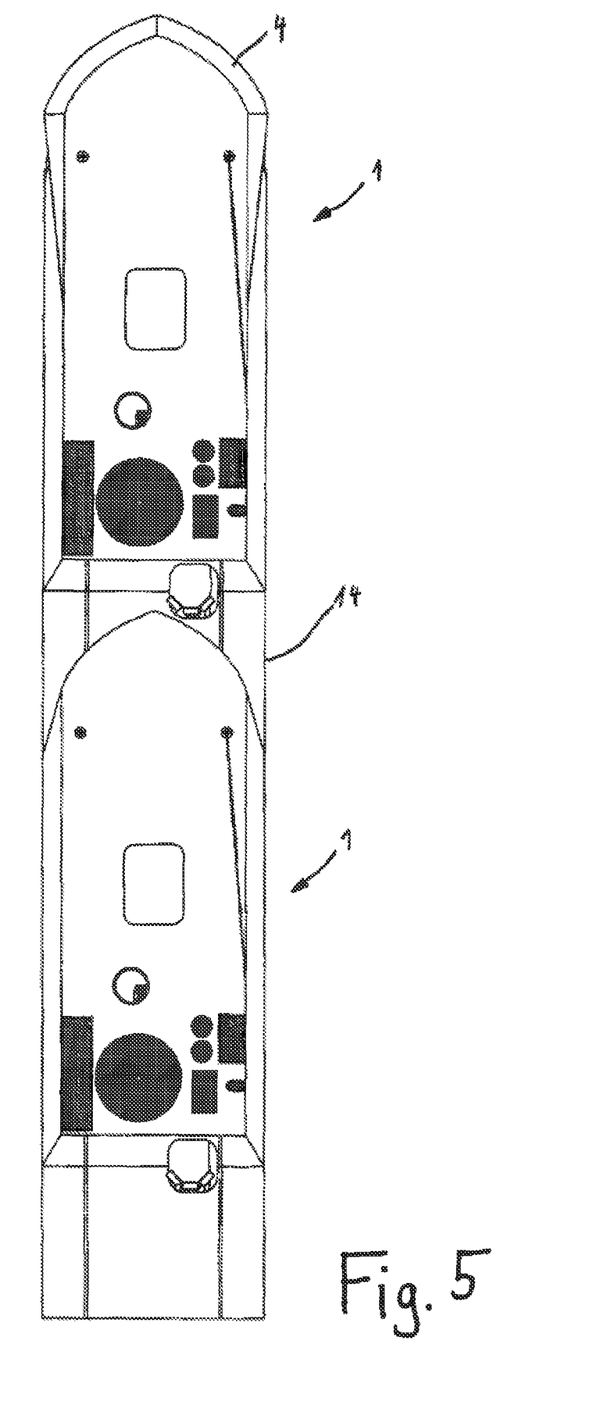

The illustration in FIG. 5 shows two amphibious vehicles 1 during water travel in a plan view. The amphibious vehicle 1 forms a floating assemblage, in which both amphibious vehicles 1 are connected to one another via a rigid coupling point 15. By means of the formation of the floating assemblage, higher speeds in the case of water travel can be achieved. By coupling two amphibious vehicles 1 together, the drive power of the floating assemblage relative to a single amphibious vehicle, is doubled, whereby a water travel speed that is increased by about 50% can be achieved.

In this connection, it is provided that in the area between the two amphibious vehicles 1, a closed flow profile 14 is produced, as can be seen in FIG. 5. It provides a smooth surface towards the sides of the floating assemblage that is aerodynamic for water operation.

Figure 6:
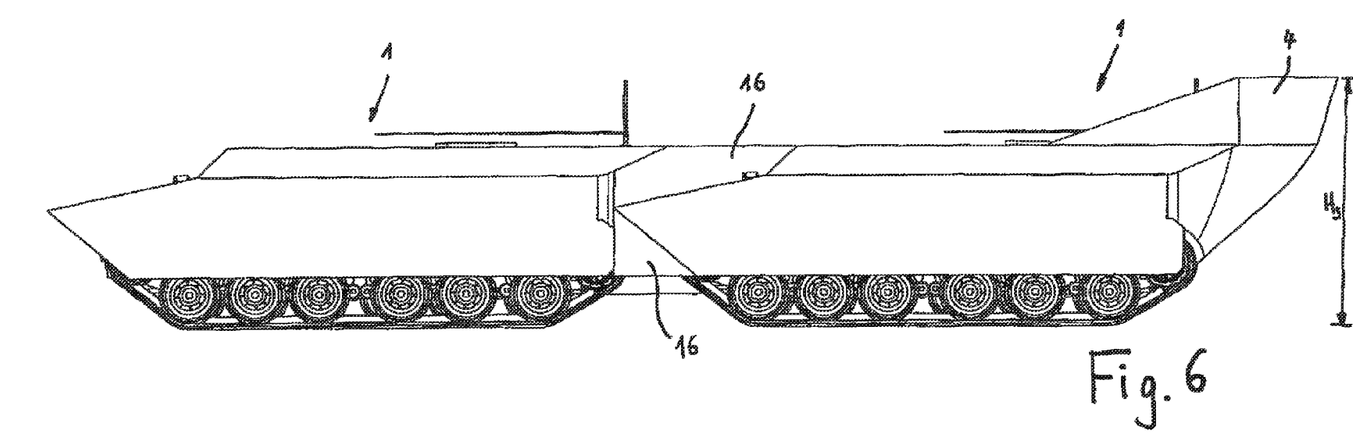
FIG. 6: shows the amphibious vehicle according to FIG. 5 in a side view as viewed from one of the sides, whereby the region between the amphibious vehicles is shown only schematically for illustrating a coupling position.

In the area between the vehicles 1, adapter elements 16 are provided for formation of the closed flow profile 14, which are shown in particular in FIG. 6. The adapter elements 16 fill the existing free space between the amphibious vehicles 1, so that the closed flow profile 14 is provided. The advantage of a closed flow profile 14 is that the floating assemblage made from the two amphibious vehicles 1 produces only a bow wash during water travel, which does not break on any free spaces between the two amphibious vehicles 1. Only a through-going wave is provided, which is associated with higher speed in the case of water travel.

The adapter elements 16 can be attachment parts included in the vehicle, which then can be releasably mounted in the event of water travel in a few simple steps in the area of the coupling point. In order to improve the buoyancy of the floating assemblage, it can be provided that the adapter elements 16 are formed as buoyant elements. Also solutions are contemplated, in which the attachment parts are included as folding or inflatable elements on the outer contour of the amphibious vehicle 1 and then can be moved over when needed into the position shown in FIG. 6.

Figure 7:
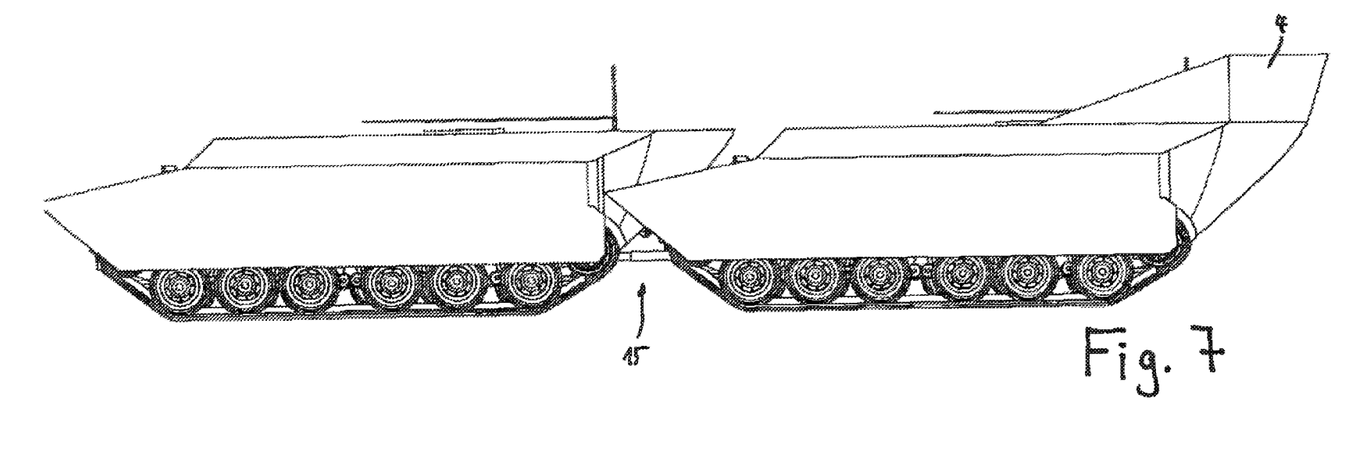
FIG. 7: shows a view corresponding to the illustration in FIG. 6 as viewed from the other side.

As also shown in FIG. 6 or FIG. 7, it is possible, for example, in the event of larger loads or in the event of larger swells to provide an amphibious vehicle 1 with a swell element 4, which increases still further the height $H_S$ of the ship's bow 3. The swell element 4 can be formed as a baffle plate, or wash plate, and can be connected releasably or non-releasably with the roof 5 of the amphibious vehicle 1. In the event of a floating assemblage made up of multiple amphibious vehicles 1, it is sufficient if the front amphibious vehicle 1 in the direction of travel is provided with a corresponding baffle or wash plate 4.

Figure 8:
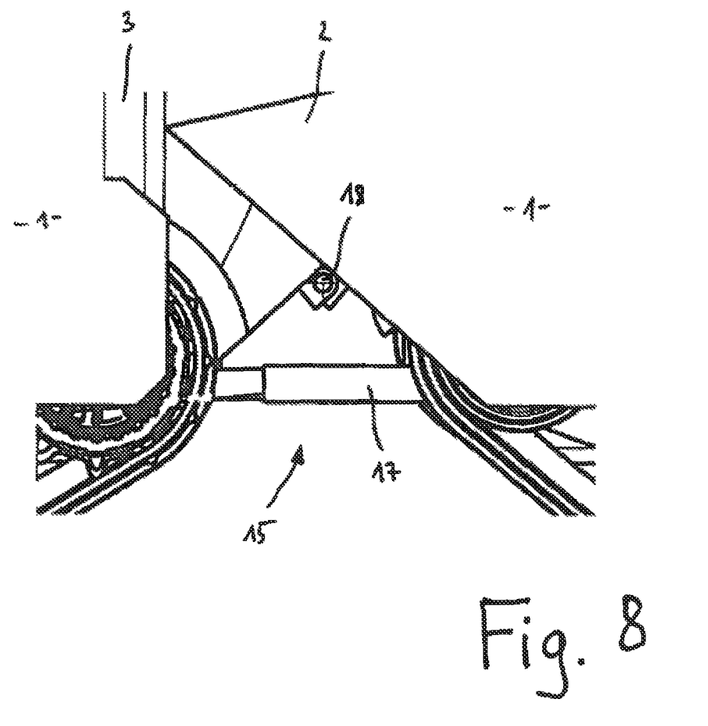
FIG. 8: shows an enlarged view of a coupling position.

As shown in FIG. 7, which is schematic and does not illustrate all of the elements, it can be provided that both amphibious vehicles 1 that form the floating assemblage are coupled to one another via a hinge-like coupling point 15, the details of which will be described below with reference to FIG. 8.

In the region of the coupling point 15, the end regions 2, 3 of the two amphibious vehicles 1 are connected to one another via at least one hydraulic cylinder 17 as well as a coupling hinge or joint 18. Advantageously, two hydraulic cylinders 17 are provided, which can be arranged on both sides of the floating assemblage. The hydraulic cylinders can be disabled by a pressure-control valve, whereby in cooperation with the coupling hinge 18, a more rigid floating assemblage is provided.

By means of the valves provided on the hydraulic cylinders 17, relative movement of the two amphibious vehicles 1, for example during landing or land travel, can be realized, in order to use high cross-country speeds of the individual vehicles also in coupled connection and to avoid overload of the coupling point 15.

The previously described amphibious vehicle 1 as well as the associated method for operating the amphibious vehicle 1 demonstrates that good driving properties for water travel with comparably good visibility conditions in land travel operation can be achieved. In addition, it is possible by forming a floating assemblage, to increase the speed during water travel.

The specification incorporates by reference the disclosure of German patent application DE 10 2011 054 949.8, filed Oct. 31, 2011, as well as PCT/DE2012/100326, filed Oct. 19, 2012.

The present invention is, of course, in no way restricted to the specific disclosure of the specification and drawings, but also encompasses any modifications within the scope of the appended claims.

The invention claimed is:

1. An amphibious vehicle, comprising:
   a first end region (2) having a surface (6) that inclines downwardly from an optical square (11) to a land driving front;
   a second end region (3) having a vehicle interior for receiving pieces of equipment or a crew with roof (5), the second end region disposed opposite said first end region in a longitudinal direction of the vehicle, wherein the second end region (3) tapers toward a vertical longitudinal center plane of the vehicle to form a ship's bow for water travel; and
   wherein a vehicle height ($H_S$) above ground of a highest portion of the roof (5) of the second end region (3) is greater than a vehicle height ($H_L$) above ground of a highest portion of the surface of the first end region (2).

2. The amphibious vehicle according to claim 1, further including a swell element (4) extending above the ship's bow, wherein the swell element increases a height ($H_B$) of the vehicle in the second end region (3).

3. The amphibious vehicle according to claim 2, wherein the swell element (4) extends upwardly from the roof (5).

4. The amphibious vehicle according to claim 2, wherein the swell element (4) is formed as a baffle plate.

5. The amphibious vehicle according to claim 1, wherein the land driving front (2) has a surface that is inclined in a direction of a road surface for improvement of the ground visibility.

6. The amphibious vehicle according to claim 1, further comprising a land drive (8) and a water drive (9), wherein said land drive (8) and said water drive (9) act in opposite directions.

7. The amphibious vehicle according to claim 6, wherein the land drive (8) is arranged in an area of the ship's bow (3) and/or the water drive (9) is arranged in an area of the land driving front (2).

8. The amphibious vehicle according to claim 6, wherein the land drive (8) and the water drive (9) are driven by a common engine (7).

9. The amphibious vehicle according to claim 8, wherein the common engine (7) is a mid-engine.

10. The amphibious vehicle according to claim 9, wherein the land drive (8) and the water drive (9) are connected to the engine (7) and are disposed on opposite sides of the engine (7).

11. The amphibious vehicle according to claim 8, wherein the land drive (8) and/or the water drive (9) is connected via a gear unit (10) to the engine (7).

12. A method for operating an amphibious vehicle (1), the method comprising:
providing an amphibious vehicle having a first end region (2) having a surface (6) that inclines downwardly from an optical square (11) to a land driving front, and a second end region (3) having a vehicle interior chamber (20) for receiving pieces of equipment or a crew and with a roof (5), the second end region disposed opposite to the first end region in a longitudinal direction of the vehicle, wherein second end region (3) tapers toward a vertical longitudinal center plane of the vehicle to form a ship's bow for water travel, and wherein a vehicle height ($H_S$) above ground of a highest portion of the roof (5) of the second end region (3) is greater than a vehicle height ($H_L$) above ground of a highest portion of the surface of the first end region (2); and
reversing a main direction of travel upon transition between land and water travel.

13. The method according to claim 12, wherein the amphibious vehicle (1) is a military amphibious vehicle.

14. The method according to claim 13, wherein the amphibious vehicle (1) rotates upon transition between land and water travel, such that during land travel, the land driving front (2) is oriented in a main direction of travel and, during water travel, the ship's bow (3) is oriented in the main direction of travel.

15. The method according to claim 13, wherein upon transition between land and water travel, a switchover between the land drive (8) and the water drive (9) occurs.

16. The method according to claim 12, further comprising operating the vehicle in water such that the second end region projects above a water line and the first end region is submerged.

17. An amphibious vehicle (1), comprising:
a first end region (2) formed as a land driving front and having an optical square (11), a roof surface (5, 6) that extends downwardly and forwardly from the optical square to provide an inclined sight path (S) from the optical square, and a driver seating position;
a second end region (3) having a roof (5) over an interior chamber (20) of the vehicle, the second end region disposed opposite the first end region in a longitudinal direction of the vehicle, the second end region (3) tapering toward a vertical longitudinal center plane of the vehicle to form a ship's bow for water travel;
a weapon station located on the roof, the weapon station having visual equipment;
wherein a vehicle height ($H_S$) above ground of a highest portion of the roof (5) of the second end region (3) is greater than a vehicle height ($H_L$) above ground to the optical square of the first end region (2); and
wherein a driver utilizes the optical square for land driving the vehicle in the direction of the first end region, and utilizes visual equipment of the weapon station during water travel in the direction of the second end region.

18. The amphibious vehicle of claim 17, wherein the vehicle height of the second end region projects always over a water line, even when the first end region is already submerged beneath the water line.

* * * * *